(12) United States Patent
Adam et al.

(10) Patent No.: US 10,269,393 B2
(45) Date of Patent: *Apr. 23, 2019

(54) TIMELINE SYNCHRONIZATION CONTROL METHOD FOR MULTIPLE DISPLAY VIEWS

(71) Applicant: AVIGILON CORPORATION, Vancouver (CA)

(72) Inventors: Matthew J. Adam, Vancouver (CA); Courtney Anne A. Cheng, Vancouver (CA)

(73) Assignee: AVIGILON CORPORATION, Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/494,192

(22) Filed: Apr. 21, 2017

(65) Prior Publication Data

US 2017/0229155 A1  Aug. 10, 2017

Related U.S. Application Data

(63) Continuation of application No. 14/805,392, filed on Jul. 21, 2015, now Pat. No. 9,659,598.

(Continued)

(51) Int. Cl.
*G11B 27/34* (2006.01)
*H04N 5/77* (2006.01)
(Continued)

(52) U.S. Cl.
CPC .............. *G11B 27/34* (2013.01); *H04N 5/77* (2013.01); *H04N 7/181* (2013.01);
(Continued)

(58) Field of Classification Search
CPC .................................. G11B 27/34; H04N 5/77
See application file for complete search history.

(56) References Cited

U.S. PATENT DOCUMENTS 9,659,598 B2 * 5/2017 Adam ................... G11B 27/34
2010/0002082 A1   1/2010 Buehler et al.
(Continued)

OTHER PUBLICATIONS

International Patent Application No. PCT/US2015/41411; Int'l Search Report and the Written Opinion; dated Dec. 14, 2015; 16 pages.
International Patent Application No. PCT/US2015/041411; Int'l Preliminary Report on Patentability; dated Sep. 2, 2016; 21 pages.

*Primary Examiner* — Thai Q Tran
*Assistant Examiner* — Girumsew Wendmagegn
(74) *Attorney, Agent, or Firm* — BakerHostetler

(57) ABSTRACT

A video surveillance system and methods for operating that sets the timeline for multiple views of video data from different cameras to playback separately from one another or to be linked so as to synchronize their playback. Placement and selection of a playback cursor to a particular point in a timeline of master view will cause linked views to automatically move to and synchronize to the same point in their associated timelines, and when the video data is being transmitted from multiple cameras to cause the cameras displaying the linked views to update so that the video data associated with each camera is updated to the selected point in time from the linked master view. Timeline resolutions for linked views are not affected by linking or unlinking views.

16 Claims, 5 Drawing Sheets

Related U.S. Application Data

(60) Provisional application No. 62/027,210, filed on Jul. 21, 2014.

(51) Int. Cl.
  H04N 21/472     (2011.01)
  H04N 7/18       (2006.01)
  H04N 21/4223    (2011.01)
  H04N 21/43      (2011.01)
  H04N 21/8547    (2011.01)

(52) U.S. Cl.
  CPC ..... H04N 21/4223 (2013.01); H04N 21/4307 (2013.01); H04N 21/47217 (2013.01); H04N 21/8547 (2013.01)

(56) References Cited

U.S. PATENT DOCUMENTS

| | | |
|---|---|---|
| 2010/0077289 A1 | 3/2010 | Das et al. |
| 2011/0185269 A1 | 7/2011 | Finkelstein et al. |
| 2011/0187865 A1* | 8/2011 | Felt .................. H04N 7/18 348/159 |
| 2012/0198317 A1 | 8/2012 | Eppolito et al. |
| 2013/0038794 A1 | 2/2013 | Ackley et al. |
| 2013/0188923 A1 | 7/2013 | Hartley et al. |
| 2014/0046550 A1 | 2/2014 | Palmer et al. |
| 2014/0152760 A1 | 6/2014 | Granstrom et al. |
| 2015/0143239 A1 | 5/2015 | Birkbeck et al. |

* cited by examiner

TIMELINE SYNCHRONIZATION CONTROL METHOD FOR MULTIPLE DISPLAY VIEWS

CROSS REFERENCE TO RELATED APPLICATIONS

This application is a continuation of U.S. patent application Ser. No. 14/805,392, filed Jul. 21, 2015, which claims the benefit of U.S. Provisional Patent Application No. 62/027,210, filed Jul. 21, 2014. The above-cited application is hereby incorporated by reference, in its entirety, for all purposes.

TECHNICAL FIELD

The present disclosure relates to a method and apparatus for the control and display of recorded video data having a timeline control function in a window of a display device.

BACKGROUND

Video surveillance systems and monitoring applications capture and record time-stamped video data from one or more security surveillance cameras and often correlate the recorded video data streams of each camera with a timeline (i.e. day, month, year and time), which is presented and controlled during review of the video data at a later date. Playback and display of the recorded video data from a camera on a computer monitor or other visual display device, like a mobile phone or tablet, is often accompanied with a graphical representation of a timeline and associated timeline control functionality that the user manipulates by dragging a pointer, finger or playback cursor (the "Playback Cursor) to select a specific time of interest from the timeline presented within a user interface window or view (the "View") of the surveillance monitoring application. Based on the specific time of interest selected within the timeline window, the surveillance system or application will then retrieve the stored time-stamped video data that correlates with the selection for playback and display to the user. If the surveillance system or application has access to video data from multiple cameras, a separate View is typically associated with each camera and a separate timeline is used to control display of the video data from each camera.

Video surveillance systems and applications typically also allow the user to select the recorded video data from one or more camera(s) from among the multiple cameras to display in within a View. The video data from each camera may then be displayed within separate sub-regions of the View. In the same manner a timeline and its associated control functionality will control the playback and display of one camera within a View, multiple cameras presented in multiple sub-regions of the View may also be controlled. For example, if a single camera is selected, only the video data from the single camera will be shown. If two cameras are selected, the video data from both cameras will be presented in two sub-regions of the View, with the total number of sub-regions displayed in the View being equal to the total number of cameras selected. In such a case, all of the cameras selected for display of video data within the View will have the same timeline and will be controlled by the single timeline control functionality.

Video surveillance applications typically also support multiple concurrent Views whereby a user may select a first set of cameras to display in a first View, and select a second set of cameras to display in a second View, with each View having its own, independent timeline, timeline control functionality, and playback state. One difficulty associated with this arrangement occurs if the user sets the Playback Cursor to a specific point in time in the first View and wishes to locate the same point in time in the second View. As the two Views are not linked in any way, the user must attempt to manually locate the same point in time in the second View timeline and then set the Playback Cursor to this point in time. When multiple concurrent Views are being used at the same time, potentially displaying video data from hundreds of independent cameras, a requirement to manually select, open and update the point in time of interest within each of those Views is both time consuming and error prone.

Finally, while some video surveillance systems or applications support the ability to link multiple Views together, the multiple Views and the multiple sub-regions displaying camera video data from a different camera and/or camera data stream (the "subview(s)") still share a single timeline. This means that initiating a timeline change in one View causes the same change to occur in the timeline of all of the other Views. Hence, multiple independent Views, multiple sub-regions of a single View, or multiple Views (with or without sub-regions) are either all singularly controlled or all simultaneously controlled by a singular controller.

SUMMARY

The present disclosure relates to a video surveillance system or application and methods for operating the same that include the ability to set the timeline for multiple Views/subviews within a View separately from one another. The described techniques also enable linking the multiple Views/subviews together so that placement and selection of the Playback Cursor to a particular point in the timeline of one View (the "Master View") will cause the Playback Cursor in the linked View(s)/subview(s) to automatically move to and synchronize to the same point in their associated timelines. In some aspects, when the video data is being transmitted from multiple cameras to cause the cameras displaying the linked subviews/Views to update, the video data associated with each camera is updated to the selected point in time from the linked Master View.

The present disclosure also enables users with the ability to link multiple independent Views/subviews together, and to easily remove a linked View/subview from a group of linked Views/subviews without affecting the behavior (i.e. independent timeline, timeline control functionality and playback state) of the other linked Views/subviews in the group. Furthermore, the timeline resolution of the timeline associated with each View/subview is retained when a View/subview is linked to or removed from the linked group. For example, the timeline of a first View can be set to a month level timeline and the timeline of a second View can be independently set to a day level timeline. When the two Views are linked together neither timeline resolution changes, rather only the Playback Cursors in the linked Views are synchronized to the same point in their associated timelines.

According to a first aspect, there is provided a video camera playback controlling system, comprising: a plurality of video cameras, wherein each camera is configured to collect video data over a timeline and to playback the collected video data for the timeline; a display for displaying the collected video data; and a computerized system coupled to the plurality of video cameras and configured to group the collected video data of two or more video cameras into one or more views, wherein the timeline for the collected video data of each video camera in a view is the same and independent of another view if the view and the another view are not linked, and wherein the timeline for the collected video data of each video camera in a view is synchronized with the timeline for the collected video data of each video camera in other views if the view and the other views are linked.

According to the first aspect, wherein each timeline for the collected video data for each video camera in a view has a timeline resolution and wherein the timeline resolution does not change when a view is linked to the other views.

According to the first aspect, wherein when a view is linked to other views the timeline resolution does not change when the link is removed and the view and the other views are unlinked.

According to a second aspect, there is provided a method for controlling a playback of a plurality of video cameras, comprising: associating a first playback state with a first view, the first view including video data collected from two or more video cameras among the plurality of video cameras over a first timeline; associating a second playback state with a second view, the second view including video data collected from two or more video cameras among the plurality of video cameras over a second timeline; linking the first view to the second view to synchronize the first playback state with the second playback state; and maintaining the first playback state independent of the second playback state when the first view is unlinked from the second view.

According to the second aspect, wherein the first timeline has a first timeline resolution, wherein the second timeline has a second timeline resolution, and wherein the first timeline resolution is independent of the second timeline resolution regardless of whether the first view is linked to the second view.

According to a third aspect, there is provided a method for controlling a playback of a plurality of video cameras, comprising: associating a first playback state with a first view, the first view including video data collected from two or more video cameras among the plurality of video cameras over a first timeline; associating a second playback state with a second view, the second view including video data collected from two or more video cameras among the plurality of video cameras over a second timeline; disabling the first playback state and associating the first view with a global playback state; linking the first view to the second view to create linked views by synchronizing playback of the first timeline with the second timeline by disabling the second playback state and associating the second view with the global playback state; and when a user sets a playback time for the global playback state, sending an update to the second view to set a playback time for the second view to the playback time for the global playback state.

According to the third aspect, wherein sending an update includes scrolling the second timeline to match the first timeline.

According to the third aspect, further comprising unlinking the linked views by disassociating the second view with the global playback state and enabling the second playback state.

According to the third aspect, wherein the first timeline includes a first timeline resolution and the second timeline includes a second timeline resolution, and further comprising maintaining the first timeline resolution independent of the second timeline resolution when the first view is linked to the second view.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description is intended to include indirect and direct connections unless otherwise indicated.

Figure 1:
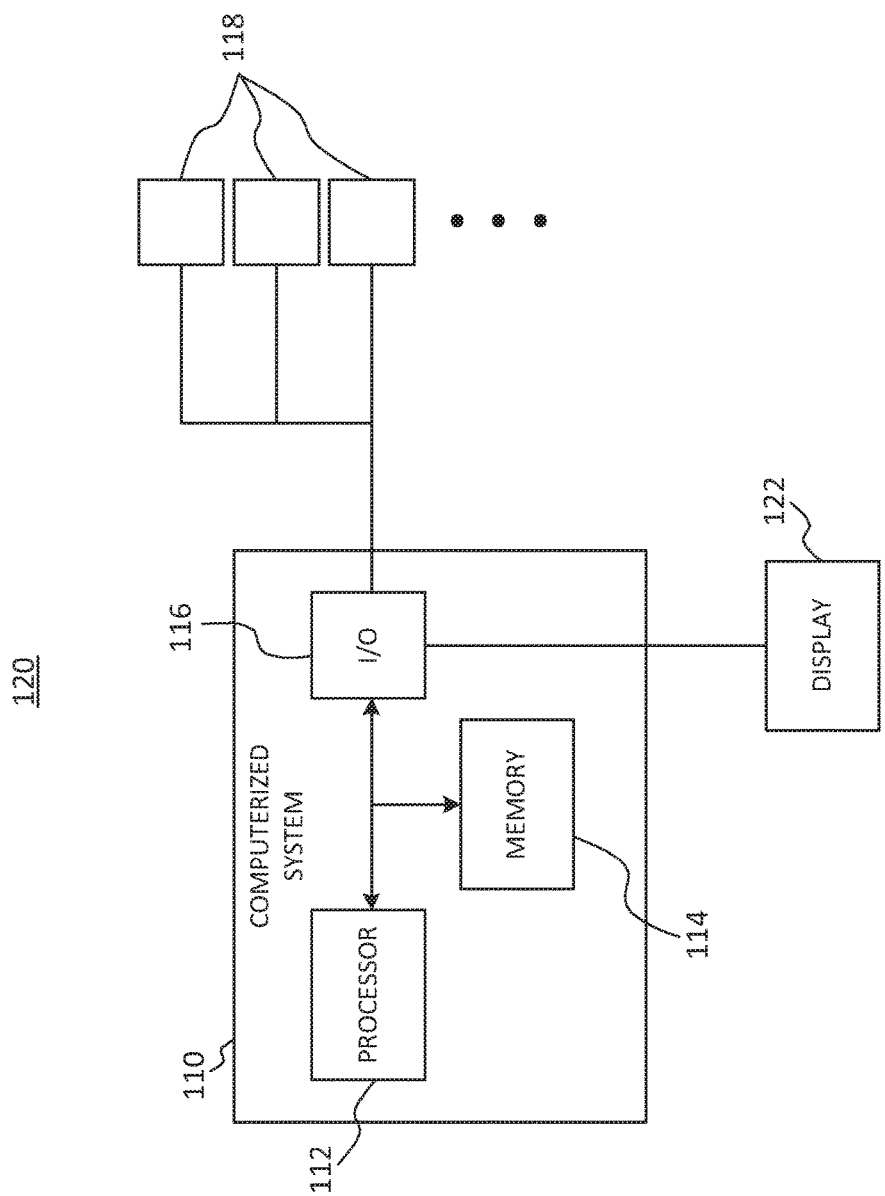
FIG. 1 is a block diagram of a surveillance system, including a computerized system and multiple monitoring devices coupled to the computerized system.

Referring to FIG. 1, a computerized system 110 is shown including a processor 112, a memory 114 and input/output devices 116 coupled together, which may in turn be coupled to multiple monitoring devices 118, such as video cameras, lights, sensors, access control systems, or any other equipment that may be used to survey and/or monitor some physical space, collectively forming a surveillance system 120. The surveillance system 120 may further include a display 122, which may also be integrated into computerized system 110. The computerized system 110 of the surveillance system 120 may include the display 122. Likewise, one or multiples of the monitoring devices 118 may include the computerized system 110 and be coupled to the display 122. One or multiple of the monitoring devices 118 may be separately connected to the computerized system 110 or connected to one another in a mesh network. The computerized system 110, whether part of a desktop system, server system, specialized control center, or a mobile device, may provide control for the surveillance system 120 and enable monitoring by users or other systems. For example, the surveillance system 20 may be primarily located within a mesh of video cameras (each a computerized system 110) that are wirelessly connected to a mobile device (a computerized system 110) with a display 122, such as a smart phone, that includes an application that permits a user to control and monitor the mesh and individual cameras therein.

Figure 2:
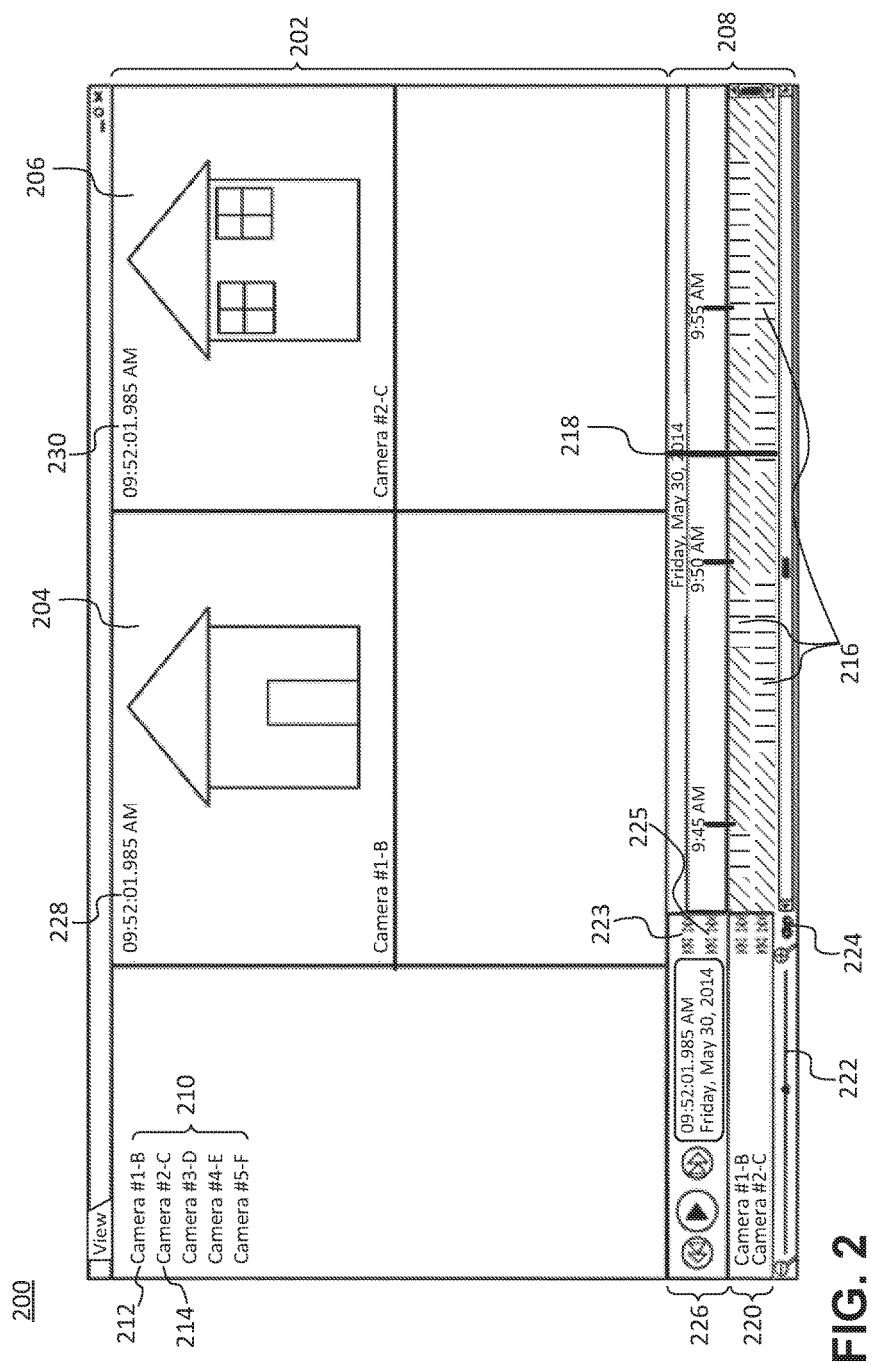
FIG. 2 is an illustration of a display window of a surveillance system showing a View having a timeline control for multiple sub-regions and linking functionality according to the present disclosure.

The display 122 may include a display window 200 as shown in FIG. 2, which may be a visual window displayed within the display 122. The display window 200 may be generated by an application executed on the computerized system 110 and display a View 202, which includes multiple sub-regions (sub-region 204 and sub-region 206) and a number of User Interface ("UI") control elements, such as the timeline 208, which is displayed at the bottom of the View 202. The timeline 208 displays rows (as illustrated, two rows, corresponding to the two sub-regions 204 and 206) of user selected cameras to display video data, which may be listed vertically. The cameras generating the video data in the sub-regions 204 and 206 are selected from a UI control element 210 which provides a list of available cameras, such as including cameras 212, 214. Each of the cameras is identified by a camera identification ("ID"), which are illustrated in the sub-regions 204 and 206. For example, camera 212 corresponds to sub-region 204, while camera 214 corresponds to sub-regions 206.

Figure 4:
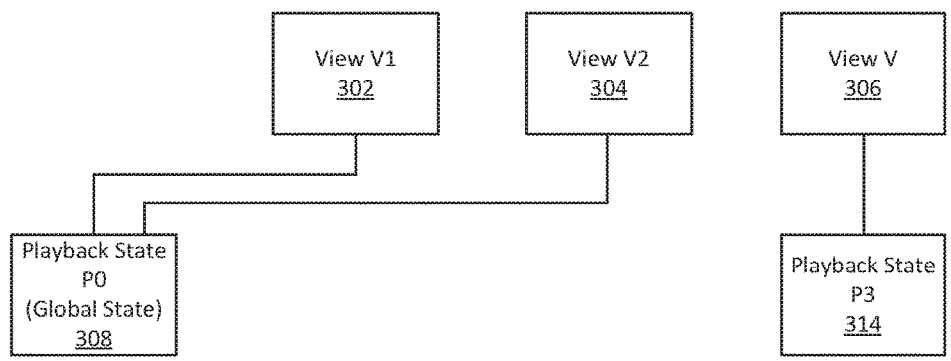
FIG. 4 is a block diagram illustrating multiple Views associated with a display window of a surveillance system, wherein two of the Views which are linked and have a common playback state while one View is un-linked and has an independent playback state according to the present disclosure.
Figure 6:
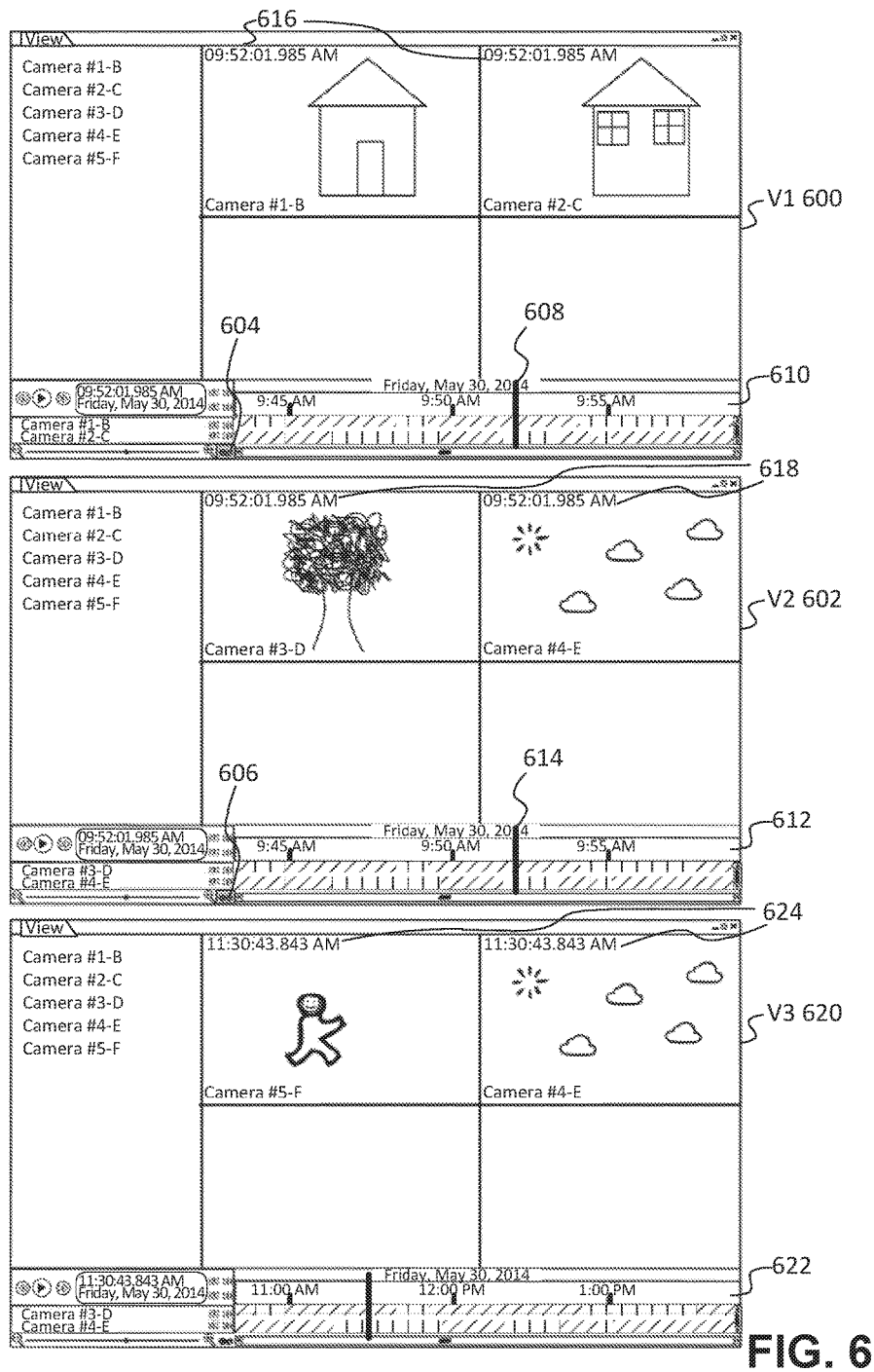
FIG. 6 is an illustration of three display windows of a surveillance system showing different Views, two of which are linked and synchronized, the third which is un-linked, according to the present disclosure.

Each row within the timeline 208 may display the time ranges for which recorded video is available, plus time ranges 216 for which events, such as motion, were detected. The timeline 208 may allow the user to individually or collectively control the playback time for all video data of cameras in the View 202. A user may click on the Playback Cursor 218 of the timeline 208 to select a particular time within the time ranges available. Other UI control elements include controllers 220 for each camera listed in the View 202, each of which controllers 220 include controls to skip ahead to an event 216 and skip back to an event 216 for the individual sub-regions, which allow the user to skip ahead or to skip back to an event for a particular camera in the timeline 208. Below the controllers 220 is a timeline resolution slider 222 that may be used to select the specific timeline resolution of the timeline for each camera listed in controller UI element 220, depending on which camera listing in element 220 is highlighted or otherwise selected while the slider 222 is in use, from minutes to hours to days and months, etc. A Link View button 224 enables the timelines for multiple independent concurrent Views, as illustrated in FIGS. 4 and 6, to be linked. Playback controller 226 enables the user to select play and to perform other control functions, such as fast forward and fast reverse or rewind. Playback controller 226 may include first playback control 223 that enable the user to skip forward or backward for a day from the time and date shown, and second playback controls 225 that enable the user to skip forward or backward by 15 minute increments. The playback controller 226 also displays the timestamp for the video data being viewed, whether a single sub-region or View or linked Views. When Views are linked, such as illustrated with respect to View V1 and View V2 as illustrated in FIG. 4 and FIG. 6, the corresponding timestamps 226 and 230 will reflect the same timestamp as illustrated in the playback controller 226.

While the embodiment illustrated in FIG. 1 references a View with video data from multiple cameras represented in sub-regions, the same description applies to subviews within a View as well as multiple Views depicted within separate display windows, as long as independent Views can be linked and synchronized and unlinked as described herein. In order to simplify the disclosure herein, any such View will be referred to as a "View" herein.

As further illustrated in FIG. 2, the View may be a single window, tab, screen or anything else that displays video data corresponding to some set of cameras. The set of cameras providing video data displayed in each View may be independent of the set of cameras providing video data displayed in all other Views, but the video data for cameras may also be displayed in more than one View if desired.

Each View may contain its own timeline, but the playback location of each timeline may optionally be "synchronized" with the playback locations of one or more other timeline on other Views. As noted above, the user selectable Link View button 224 facilitates the linking and synchronization of other concurrent Views. As shown in FIG. 2, the Link View button 224 is depicted as a "Chain Icon," but could have any other appropriate design. To operate the Link View button 224, the user only needs to be in a View 200, and then click the Link View button 224 to turn the linking state on or off. For a particular View, the linked together or broken chain icon of the Link View button 224 may indicate if the timeline is globally linked and synchronized or not. When the Link View button 224 is enabled, that timeline's playback location is synchronized with the timeline location of one or more, and in some cases, every other View timeline that has also enabled synchronization.

Figure 3:
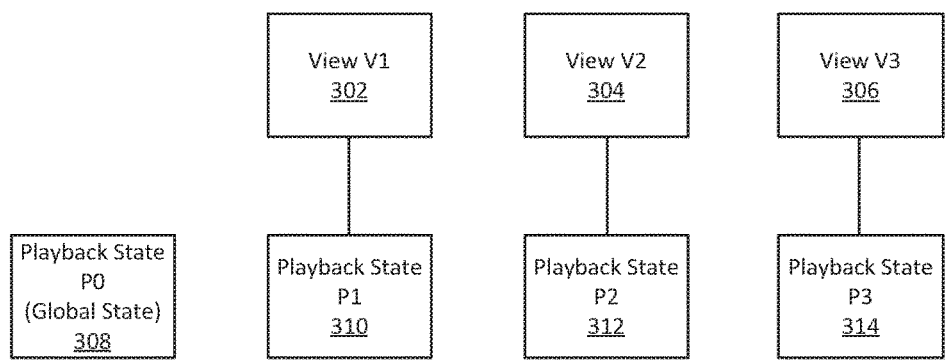
FIG. 3 is a block diagram illustrating multiple Views associated with a display window of a surveillance system, wherein each View is un-linked and has an independent playback state according to the present disclosure.

FIG. 3 further illustrates the underlying logic associated with the display and control of the Views. Each View (V1 302, V2 304, and V3 306) may have an associated 'Playback State' (P1 310, P2 312, and P3 314, respectively). A 'Playback State' may be a logical construct that manages all aspects associated with playing back video data for one or more cameras in a View. This state may include playback time, playback mode (i.e., playing or paused), and playback speed (i.e., rewind, fast forward). Every View may be associated with exactly one Playback State. The Playback State associated with a View may determine the video playback characteristics for all cameras in the View. All cameras in the View may display video at the time specified by the Playback State, may mirror the play/pause state of the Playback State, etc. There may also be a Global Playback State (P0) 308, which is a single Playback State that exists in the system and that may be used for synchronizing Playback States between Views, such as V1 302, V2 304, and/or V3 306.

More specifically, in the un-linked case shown in FIG. 3, every View 302, 304, 306 is associated with its own unique Playback State 310, 312, 314, and the Global Playback State 308 is not associated with any Views. In the contrasting linked case shown in FIG. 4, View V1 302 and View V2 304 are associated with the Global Playback State (P0) 308 instead of having their own independent Playback State, like View V3 306, which is associated with playback state P3 314.

As described herein, generally the first View to have synchronization turned 'ON' (i.e., via the Link View button 224) is deemed the "Master". When synchronization for a View is turned on, the individual Playback State for that View is disabled. Thereafter, all Views for which synchronization is turned 'ON' may be synchronized to the Master's timeline and the individual Playback State for each synchronized View is disabled. Turning synchronization 'OFF' un-links the specific View and re-enables the View's individual Playback State, which allows the user to change the date/time for a specific View without affecting other Views. It is important to note, however, that linking and un-linking a View may not affect the timeline resolution setting of a particular View. That is to say, if a timeline resolution for a first View is set to display days of a week, and the timeline resolution for a second View is set to display a particular day within a week, those display resolutions will not change if the Views are linked or unlinked. What may happen when a timeline change is made by a user to a select a particular day and time within a week for the linked Views is that both Views may be synchronized to the same day and time position in their relative timelines (at their respective timeline resolutions), which may cause either View or both Views to update the video data as displayed in their View.

Figure 5:
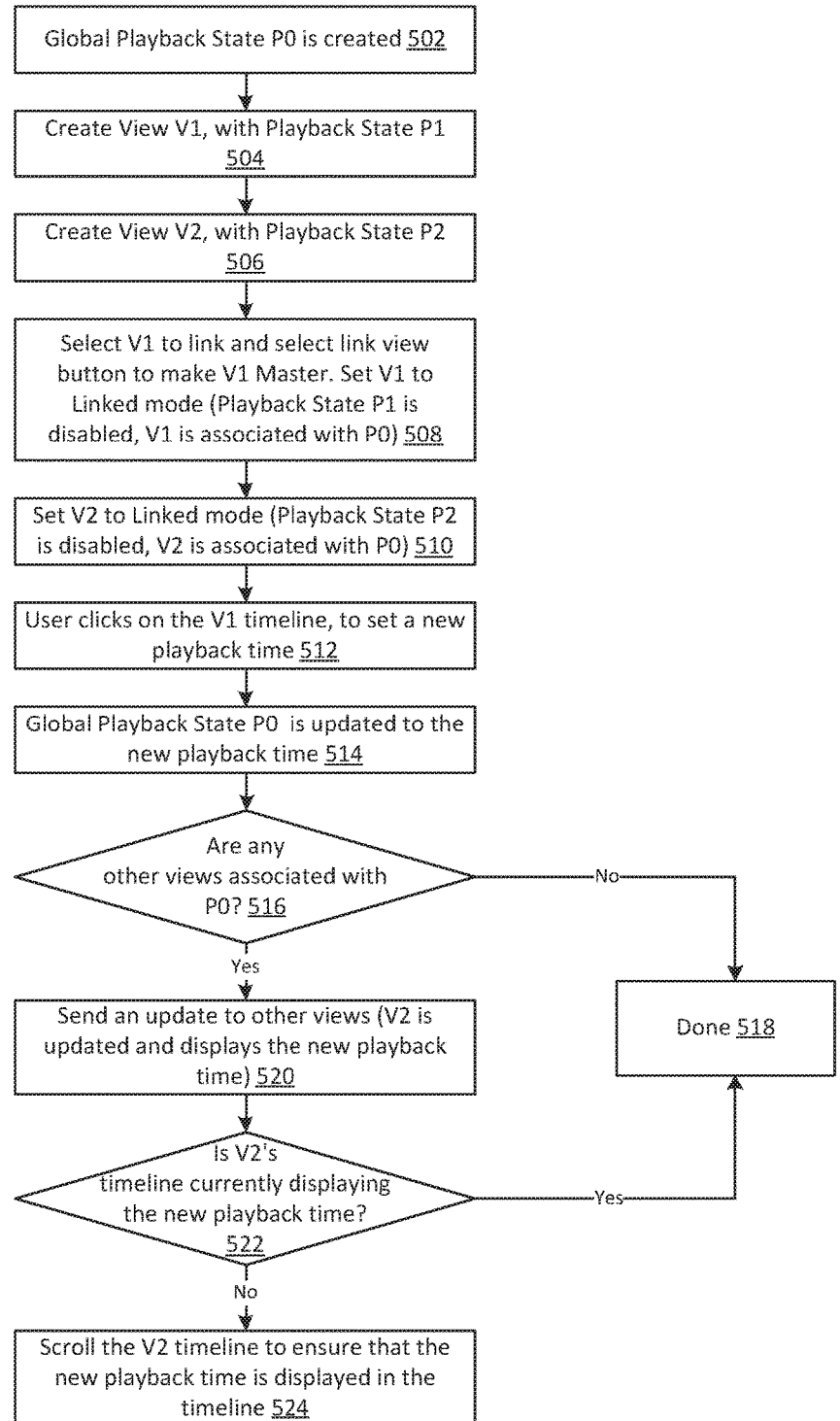
FIG. 5 is a flowchart illustrating timeline synchronization, linking and control according to the present disclosure.

Referring to FIG. 5, and with reference to FIG. 6, an embodiment of a method for creating Views and Playback States, linking Views to synchronize Views and otherwise controlling Views and playback as described herein is further described. While FIGS. 5 and 6 describe steps for linking two out of three Views, and updating their playback state for the linked and synchronized Views, the same method can be extended to an unlimited number of Views and is not limited by this particular description, which is as follows:

Operation 502: At system startup, a Playback State P0, such as playback state 308, is created, representing a Global Playback State for use when synchronizing other View states.

Operations 504 and 506: The user creates two Views, V1 600 and V2 602, each of which have their own associated Playback States, P1 and P2. In some aspects, V1 600 and V2 6-2 may correspond to V1 302 and V2 304 of FIGS. 3 and 4, and may be associated with playback states 310 and 312 respectively.

Operation 508: After selecting View V1 600, the user clicks on the Link View button 604 to make V1 600 the Master. This causes the View V1 600 to disable its own Playback State (P1) and associate itself with the Global Playback State (P0).

Operation 510: The user selects View V2 602 and clicks on the Link View button 606 to link V2 602 with V1 600. This causes the View V2 602 to disable its own Playback State (P2), and associate itself with the Global Playback State (P0).

Operations 512 and 514: When the user clicks on the Playback Cursor 608 for the timeline of V1 600, in order to change the playback time, as the Master V1 600 commits the new time to its associated Global Playback State P0.

Operations 516 and 518: If Global Playback State P0 is not associated with any additional Views the process is done at 518, but if Global Playback State P0 is associated with additional Views, the Master dispatches a message to the other Views to notify them of the update to the Global Playback State. In this case, View V2 602 receives the update message and updates its own cameras and timeline to display the new time.

Operations 520-524: View V2 602 checks to see whether the new playback time is within its currently displayed timeline bounds. If the new playback time is within the current bounds, the process is done at 518. If the new playback time is outside of the bounds, the timeline is scrolled to ensure that the timeline is displaying the new bounds at operation 524. The timeline resolution states for each timeline are not modified. This means that if V1 600 was zoomed to display a year of data, while V2 602 was zoomed to display an hour of data, after synchronization, V1 600 would still display a year of data, and V2 602 would display an hour of data.

Referring further to FIG. 6, there are three Views displayed. View V1 600 and View V2 602 are linked. After the linking and synchronization steps described above, the timeline 610 of View V1 600 and the timeline 612 of View V2 601 are synchronized so that the same times and dates appear in the timeline area of each View, and the video data displayed from each independent camera is synchronized and displayed for the selected time (i.e., Playback Cursor 608 is set to the same position as Playback Cursor 614). The video data is simultaneously synchronized, as can be seen from the fact that the time stamps 616 of the individual camera video data frames for View V1 600 are exactly the same as the time stamps 618 of the individual camera video data frames for View V2 602. View V3 620, however, is not linked so the timeline area 622 is different from timelines 610 and 612 of View V1 600 and View V2 602, respectively and the time stamps 624 do not match the time stamps 616 and 618.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method, comprising:
    grouping collected video data into a first view of first video data and a second view of second video data, wherein the first video data is associated with a first timeline and the second video data is associated with a second timeline;
    linking the first view to the second view to:
        synchronize the first timeline with the second timeline; and
        transform separate control of the first and second views from separate first and second controllers to singular control by the first controller; and
    subsequent to the linking, unlinking the first view from the second view to:
        cause the first timeline to become independent of the second timeline; and
        revert the singular control by the first controller to the separate control provided by the separate first and second controllers.

2. The method as claimed in claim 1, further comprising:
    before the grouping, sending the collected video data from a plurality of video cameras to a computerized system.

3. The method as claimed in claim 2, wherein the computerized system is a server system.

4. The method as claimed in claim 1, wherein the first and second timelines have respective timeline resolutions that are fixed when the first view is linked to the second view.

5. The method as claimed in claim 1, further comprising:
    displaying via a user interface:
        a first area for displaying the first video data; and
        a second area for displaying the second video data.

6. The method as claimed in claim 5, further comprising:
    receiving, by the user interface, one or more selection events associated with at least one of the first and second controllers; and
    changing displayed video data in at least one of the first and second areas in response to the receiving of the one or more selection events.

7. The method as claimed in claim 6, further comprising:
before the grouping, sending the collected video data from a plurality of video cameras to a computerized system.

8. The method as claimed in claim 7, wherein the computerized system is a server system.

9. A non-transitory computer readable medium including instructions, that upon execution by a computing device, cause the computing device to perform the operations of:
grouping collected video data into a first view of first video data and a second view of second video data, wherein the first video data is associated with a first timeline and the second video data is associated with a second timeline;
linking the first view to the second view to:
synchronize the first timeline with the second timeline; and
transform separate control of the first and second views from separate first and second controllers to singular control by the first controller; and
subsequent to the linking, unlinking the first view from the second view to:
cause the first timeline to become independent of the second timeline; and
revert the singular control by the first controller to the separate control provided by the separate first and second controllers.

10. The non-transitory computer readable medium of claim 9, wherein the instructions cause the computing device to perform the additional operations of:
before the grouping, sending the collected video data from a plurality of video cameras to a computerized system.

11. The non-transitory computer readable medium of claim 10, wherein the computerized system is a server system.

12. The non-transitory computer readable medium of claim 9, wherein the first and second timelines have respective timeline resolutions that are fixed when the first view is linked to the second view.

13. The non-transitory computer readable medium of claim 9, wherein the instructions cause the computing device to perform the additional operations of:
displaying via a user interface:
a first area for displaying the first video data; and
a second area for displaying the second video data.

14. The non-transitory computer readable medium of claim 13, wherein the instructions cause the computing device to perform the additional operations of:
receiving, by the user interface, one or more selection events associated with at least one of the first and second controllers; and
changing displayed video data in at least one of the first and second areas in response to the receiving of the one or more selection events.

15. The non-transitory computer readable medium of claim 14, wherein the instructions cause the computing device to perform the additional operations of:
before the grouping, sending the collected video data from a plurality of video cameras to a computerized system.

16. The non-transitory computer readable medium of claim 15, wherein the computerized system is a server system.

* * * * *